(12) United States Patent
Van Liden

(10) Patent No.: US 9,889,525 B2
(45) Date of Patent: Feb. 13, 2018

(54) METHOD OF HARDFACING A PART

(71) Applicant: ETABLISSEMENTS CHPOLANSKY, Marcoussis (FR)

(72) Inventor: Serge Van Liden, Moissy Cramayel (FR)

(73) Assignee: ETABLISSEMENTS CHPOLANSKY (FR)

( * ) Notice: Subject to any disclaimer, the term of this patent is extended or adjusted under 35 U.S.C. 154(b) by 1047 days.

(21) Appl. No.: 13/927,206

(22) Filed: Jun. 26, 2013

(65) Prior Publication Data
US 2014/0001161 A1    Jan. 2, 2014

(30) Foreign Application Priority Data
Jul. 2, 2012 (EP) .................................. 12174603

(51) Int. Cl.
*B23K 26/34* (2014.01)
*B23K 26/32* (2014.01)
(Continued)

(52) U.S. Cl.
CPC .............. *B23K 26/32* (2013.01); *B23K 26/34* (2013.01); *B23K 26/342* (2015.10); *B23P 6/00* (2013.01); *C23C 24/106* (2013.01); *B23K 2201/20* (2013.01); *B23K 2201/35* (2015.10); *B23K 2203/04* (2013.01); *B23K 2203/05* (2015.10);
(Continued)

(58) Field of Classification Search
CPC ................ B23K 26/34; B23K 2201/20; B23K 2201/34; B23K 2203/04; B23K 2230/06; B23K 2203/12; B23K 2203/50; B23K 26/345; B23K 26/32; B23K 2203/08;
(Continued)

(56) References Cited

U.S. PATENT DOCUMENTS 4,323,756 A * 4/1982 Brown ................... B22F 3/006
                                                    219/121.66
4,471,034 A    9/1984 Romero et al.
(Continued)

FOREIGN PATENT DOCUMENTS

CH    658045 A5    10/1986
JP    1091987       4/1989
(Continued)

OTHER PUBLICATIONS

French Preliminary Search Report for Application No. FR1155889 dated Feb. 14, 2012.
(Continued)

*Primary Examiner* — Dana Ross
*Assistant Examiner* — Kuangyue Chen
(74) *Attorney, Agent, or Firm* — Lerner, David, Littenberg, Krumholz & Mentlik, LLP

(57) ABSTRACT

Disclosed are methods of hardfacing a glass mold made of cast iron, bronze, or steel comprising: machining an edge of the mold so as to form a flat surface, for example a flat spot or a chamfer; depositing a determined quantity of hardfacing material on the flat surface of the edge thereby machined, the hardfacing material comprising a metal or a metal alloy; and, simultaneously, locally welding the hardfacing material on the flat surface by means of a beam of a laser, so as to form a reinforcement zone.

9 Claims, 4 Drawing Sheets

(51) Int. Cl.
*B23P 6/00* (2006.01)
*C23C 24/10* (2006.01)
*B23K 26/342* (2014.01)
B23K 101/20 (2006.01)
B23K 103/04 (2006.01)
B23K 103/06 (2006.01)
B23K 103/12 (2006.01)
B23K 103/18 (2006.01)
B23K 103/00 (2006.01)
B23K 101/34 (2006.01)

(52) U.S. Cl.
CPC ...... *B23K 2203/06* (2013.01); *B23K 2203/12* (2013.01); *B23K 2203/18* (2013.01); *B23K 2203/26* (2015.10); *B23K 2203/50* (2015.10); *B23K 2203/52* (2015.10)

(58) Field of Classification Search
CPC  B23K 26/342; B23K 2203/18; C23C 24/106; B23P 6/00
USPC ...................................................... 219/76.14
See application file for complete search history.

(56) References Cited

U.S. PATENT DOCUMENTS

| | | | | |
|---|---|---|---|---|
| 5,338,941 A | * | 8/1994 | Sappok | ..................... C23C 4/08 250/496.1 |
| 5,577,092 A | * | 11/1996 | Kublak | ................... B82Y 10/00 378/119 |
| 2004/0086635 A1 | | 5/2004 | Grossklaus et al. | |
| 2004/0146739 A1 | * | 7/2004 | Karhinen | ................ C10G 9/203 428/679 |
| 2005/0131522 A1 | * | 6/2005 | Stinson | ...................... A61F 2/91 623/1.15 |
| 2006/0138101 A1 | * | 6/2006 | Zauner | ................... B23K 26/10 219/121.64 |
| 2014/0027415 A1 | * | 1/2014 | Lin | ...................... B23K 9/1274 219/121.64 |

FOREIGN PATENT DOCUMENTS

| | | | | |
|---|---|---|---|---|
| WO | 0128942 A1 | | 4/2001 | |
| WO | WO 0128942 A1 | * | 4/2001 | ............... C03B 9/48 |
| WO | 2009090622 A1 | | 7/2009 | |

OTHER PUBLICATIONS

European Search Report for Application No. EP12174603 dated Oct. 1, 2012.

* cited by examiner

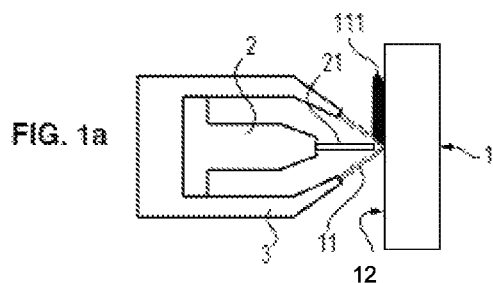
FIG. 1a
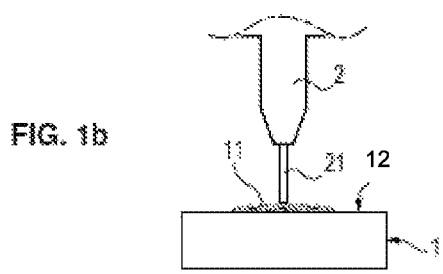
FIG. 1b
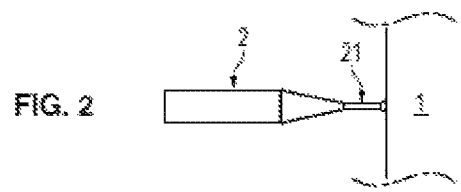
FIG. 2
FIG. 3
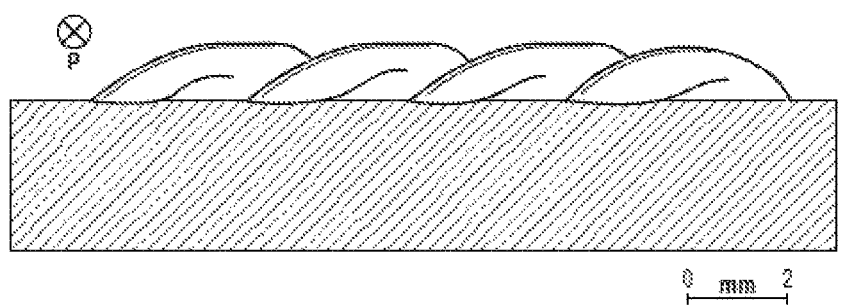

METHOD OF HARDFACING A PART

CROSS-REFERENCE TO RELATED APPLICATIONS

This application claims the benefit of the filing date of European Patent Application No. EP 12174603.6 filed Jul. 2, 2012, the disclosure of which is hereby incorporated herein by reference.

FIELD OF THE INVENTION

The invention relates, in a general manner, to foundry parts in the field of glass making, notably moulds made of cast iron, bronze (and other alloys comprising copper and tin) or steel used to make glass objects such as bottles.

The invention relates more particularly to surface hardfacing treatments of such moulds with a view to the finishing or the repair thereof, comprising the deposition of a material, for example a molten metal, on the surface of a mould, notably at the level of the edges and the surface thereof.

BACKGROUND OF THE INVENTION

The moulds made of cast iron, bronze (and other alloys comprising copper and tin), or steel (notably steels of iron-carbon, stainless steel, refractory steel type) which are generally used in the making of glass objects, have a tendency to wear rapidly, in particular in zones such as the joint plane J (or seam), the bottom F, the ring or instead the neck C of the mould. In fact, during the step of moulding the parison, in this particular case glass, the moulds undergo a phenomenon of abrasion and/or corrosion, on account of the presence of silica in the glass. Furthermore, during a moulding cycle, a mould can undergo strong thermal stresses, passing in a very short time from 400° C. to 800° C.

In order not to have to change the entire mould, hardfacing techniques have thus been proposed, during which a layer of metal alloy is made to melt on the surface of the mould, notably at the level of the edges. The mould thereby obtained is then machined after cooling in order to obtain the desired geometry.

The hardfacing of the moulds is carried out with a blowtorch or by plasma transferred arc (PTA).

Blowtorch hardfacing consists in brazing a powder or a metal wire on the moulding surfaces of the mould. To do this, the mould is preheated to a temperature of the order of 350° C. to 650° C., and one melts with the blowtorch the hardfacing metal as well as a superficial layer of the mould with the blowtorch in order to thereby ensure the bond between the two materials.

However, this hardfacing technique is carried out manually. It thus has several drawbacks, among which the drudgery of the work for the operator (who has to work for twenty or so minutes in an environment close to a temperature near to 650° C. in order to guarantee the brazing of the metals), the necessity of know-how of the operator and a wide variability of results. It may in fact be noted that the success rate does not exceed 90% of the filled parts, and can go down to 25%, on account of disbondments of hardfacing metals.

Furthermore, in order to obtain a geometry similar to the initial geometry of the mould, generally a very large quantity of hardfacing metal is deposited (of the order of double the necessary quantity, or more), then the resulting surface is machined. This method is thus costly in raw materials, and the machining operation is long and fastidious.

Finally, the zone of the mould which has been overheated during the hardfacing process has thermal and mechanical properties different to the rest of the cast iron constituting the mould. In fact, for a mould made of cast iron, in said zone, known as "Heat Affected Zone" (HAZ), the cast iron becomes "white", in other words very hard and brittle, fragile and difficult to machine. The mould thus becomes more fragile in this zone and is thus likely to break more easily in the case of mechanical or thermal shocks. Yet, in the case of hardfacing by blowtorch, the HAZ is relatively large and has as a general rule dimensions (surface and depth) of the order of 3 to 4 mm.

In order to limit the extent of the HAZ on the finished mould, it has been proposed to carry out a re-crystallisation annealing of the mould for several hours. This step is however rarely implemented because too long and too restrictive.

Plasma transferred arc (PTA) hardfacing for its part follows a similar principle to hardfacing by blowtorch, the source of heat being replaced by a plasma column.

The advantage of this method is that the plasma has a much higher temperature than the flame of a blowtorch (from 15000 to 20000° C.), which makes it possible to heat more rapidly the hardfacing material to be melted and the surface of the part on which it is deposited, thereby restricting the dimensions of the HAZ to around 2 mm.

Furthermore, the success rate of this method is much better than in the case of a hardfacing by blowtorch (of the order of 95%), since it may be automated.

It has nevertheless certain drawbacks. In particular, it is very difficult to apply it to lamellar cast irons (cast irons in which the carbon is in lamellar graphite form) because the application of the method leads to a risk of degassing of the graphite, which can cause defects (for example holes) in the deposit. It will be recalled in fact that the proportion of carbon in a given cast iron is not fixed, but rather an order of magnitude that can vary within a given bracket. Yet, this proportion may have important consequences on the result obtained in the HAZ. Moreover, it remains of important dimensions within the scope of the PTA method.

Furthermore, the quantity of hardfacing metal welded onto the mould remains important compared to the quantity necessary to obtain the desired final geometry, thereby increasing the overall cost of the hardfacing.

Finally, this method necessitates preheating the mould to a temperature of the order of 350° C., which imposes cooling the part by stages after the hardfacing if it is wished to preserve the mechanical and thermal properties of the cast iron, which can last several hours.

The document WO 2009/090622 describes a method of repairing a damaged glass mould, in which a crack has formed for example, during which the whole of the cavity of the mould is machined in order to remove a metal layer from the mould. The mould is then heated to a temperature of the order of 450° C. with the aim of opening the crack and removing a surface layer of metal around the crack, before filling the crack with molten metal and leaving the mould to cool to ambient temperature. The mould is then annealed at a temperature of the order of 600° C., then a hardfacing layer of melted metal is deposited on the whole of the cavity thereof over a thickness greater than that of the metal layer that has been removed during the machining step, for example by depositing a metal powder on the surface of the mould which is remelted and consolidated by means of a laser beam. Finally, the cavity of the mould is machined in order to remove the excess of material.

This method thus makes it possible to repair glass moulds and to extend the lifetime thereof. Nevertheless, it necessitates numerous steps, of which in particular steps of machining the whole of the cavity thereof (twice), preheating, annealing, etc. which are long, fastidious and have a high cost in raw materials and in energy. In addition, a large quantity of hardfacing material is necessary in order to be able to machine the surface of the mould after depositing the hardfacing material, and it is difficult to envisage from the industrial point of view hardfacing the whole of the surface of a glass mould by means of a laser.

The document WO 01/28942 for its part proposes hardfacing the surface of glass moulds during which the cavity of the mould is covered with a protective layer so as to make the internal surface of the mould more resistant to the different moulding cycles. To do this, this document suggests the deposition of a powder of metal alloy having an appropriate composition in the cavity, for example by thermal spraying, then the melting of the powder by heating the mould under vacuum at high temperature. This method has the advantage of extending the lifetime of the mould. Nevertheless, it has a high cost, notably in terms of filler material, and may be difficult to implement according to the powder melting technique used.

In the case where the mould would be all the same damaged despite its protective layer, this same document proposes locally repairing the mould by melting a patch of metal alloy (of the same appropriate composition) on the damaged zone. Nevertheless, according to the means used for melting the patch, it risks disbonding, or at least locally weakening the mould. Furthermore, its metallurgical quality is lower in comparison with that of the rest of the mould.

Thus, current techniques are always very imperfect and do not give entire satisfaction either with regard to their efficiency or their rapidity.

SUMMARY OF THE INVENTION

Consequently, an objective of the present invention is to propose a method of hardfacing glass moulds made of cast iron, bronze (and other alloys comprising copper and tin), or steel (notably steels of iron-carbon, refractory steel, stainless steel type), making it possible to hardface and/or repair glass moulds, which is rapid to implement, less sensitive to the composition of the cast iron used, the success rate of which is similar or even better than in the scope of hardfacing by PTA, while limiting the quantity of hardfacing metal necessary.

In this respect, the invention proposes a method of hardfacing a glass mould made of cast iron, bronze, or steel, characterised in that it comprises the steps consisting in:

machining an edge of the mould so as to form a flat surface, for example a flat spot or a chamfer, depositing a determined quantity of hardfacing material on the flat surface of the edge thereby machined, the hardfacing material comprising a metal or a metal alloy, and, simultaneously, locally welding the hardfacing material on the flat surface by means of a beam of a laser, so as to form a reinforcement zone.

Other optional and non-limiting characteristics of the method of hardfacing are the following:

the steps of deposition and welding of the hardfacing material are implemented without preheating the mould, the hardfacing material comes in powder form, the hardfacing material is sprayed by means of a nozzle on the mould, the mould to be hardfaced is arranged downstream of a focusing zone of the beam of the laser, the hardfacing material is sprayed on the flat surface, downstream of the focusing zone of the beam of the laser, the focusing zone is arranged at a distance comprised between 2 mm and 15 mm from the flat surface, preferably ten or so millimeters, one or two passages of the beam of the laser are performed on the flat surface of the mould to be hardfaced according to a controlled scanning speed, the scanning speed is comprised between 600 mm/min and 2000 mm/min, and the method comprises a later step of machining the protective layer.

According to a second aspect, the invention also proposes a glass mould made of cast iron, bronze (and other alloys comprising copper and tin) or steel, comprising at the level of an edge at least one zone covered with a metal or metal alloy so as to form a reinforcement zone, characterised in that the protective layer has been formed according to the method described above.

In a non-limiting manner, the mould may for example comprise a lamellar or spheroidal cast iron.

According to a third aspect, the invention also proposes a method of hardfacing a glass mould made of cast iron, bronze, or steel, comprising the steps consisting in:

machining a surface of the mould so as to form a flat surface, depositing a determined quantity of hardfacing material on the surface of the mould, the hardfacing material comprising a metal or a metal alloy, and, simultaneously, locally welding the hardfacing material on the surface by means of a beam of a laser, so as to form a reinforcement zone.

Other optional and non-limiting characteristics of the method of hardfacing are the following:

the steps of depositing and welding the hardfacing material are implemented without preheating the mould, the hardfacing material comes in powder form, the hardfacing material is sprayed by means of a nozzle on the mould, the surface of the mould to be hardfaced is arranged downstream of a focusing zone of the beam of the laser, the hardfacing material is sprayed on the flat surface, downstream of the focusing zone of the beam of the laser, the focusing zone is arranged at a distance comprised between 2 mm and 15 mm from the flat surface, preferably about ten millimeters, one or two passages of the beam of the laser are carried out on the flat surface of the mould to be hardfaced according to a controlled scanning speed, the scanning speed is comprised between 600 mm/min and 2000 mm/min, the method comprises an ulterior step of machining the reinforcement zone, According to a fourth aspect, the invention proposes lass mould made of cast iron, bronze or steel, comprising at the level of an edge at least one zone covered with a metal or metal alloy so as to form a reinforcement zone, in which the reinforcement zone has been formed according to the aforementioned method.

In a non-limiting manner, the mould may comprise a lamellar or spheroidal cast iron.

BRIEF DESCRIPTION OF DRAWINGS

Other characteristics, aims and advantages of the present invention will become clear on reading the detailed description that follows, with reference to the appended figures, given as non-limiting examples and in which:

FIGS. 1a and 1b schematically represent two embodiments of a method of hardfacing according to the invention.

FIG. 2 schematically represents a laser that can be used in the method according to the invention.

FIG. 3 represents an example of result obtained according to one form of embodiment of a method according to the invention.

FIG. 4b represents an example of a glass mould, an edge of which has been machined so as to form a flat surface chamfer, the mould being seen in section along the axis X-X of FIG. 3a.

FIG. 4c is an enlarged scale view of a first example of implementation of the method applied to the hardfacing of a flat surface chamfer of a mould, the mould being seen in section along the axis X-X of FIG. 4a.

FIG. 4d is an enlarged scale view of a second example of implementation of the method applied to the hardfacing of a chamfer of a mould, the mould being seen in section along the axis X-X of FIG. 4a.

DETAILED DESCRIPTION OF THE INVENTION

We will now describe a method of hardfacing glass moulds made of cast iron, bronze (and other alloys comprising copper and tin), or steel of iron-carbon steel, refractory steel or stainless steel type.

The method of hardfacing makes it possible to reinforce locally the glass mould, in particular at the level of the zones of the mould likely to be damaged during the use thereof, whether by metal fatigue or due to the high temperatures undergone. These are mainly the edges of the mould, in other words the neck C, the joint plane J and the bottom F of the mould 1. It may be adapted notably to hardface the mould at the different moulding cycles (and then consists in a step of finishing the mould), or to repair it locally.

Hereafter, we will describe more particularly the method as a step of finishing a glass mould, making it possible to reinforce locally the mould. The glass mould treated by the method is thus generally a new or at least undamaged mould, which will be hardfaced according to the steps of the invention in order to be able to reinforce it and protect it from the different thermal and mechanical shocks that it is going to undergo during its use. This is not however limiting, given that the method may be applied mutatis mutandis to the repair of a damaged glass mould, by applying the different steps to the locally damaged zones.

Figure 4A:
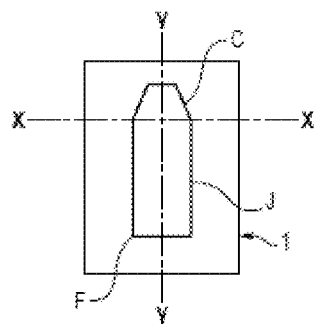
FIG. 4a schematically represents an example of glass mould that can be hardfaced according to a method of hardfacing according to the invention.

The moulds 1 that may be the subject matter of the method are conventional moulds in the field of glass making. For example, they may be moulds constituted of lamellar or spheroidal cast iron, and the cast iron may typically comprise a percentage of carbon comprised preferably between 3.3% and 3.6%, and in all cases less than 4.55%. The moulds 1 can also be made of bronze (and other alloys comprising copper and tin) or steel as evoked above. An example of such a glass mould is represented in FIG. 4a.

With reference to FIG. 1a, the edges intended to be reinforced are firstly machined so as to form a flat surface 12. For example, in the case of the joint plane J, a flat spot 12 along the joint plane is formed, whereas in the case of the neck C or the bottom F, preferably a flat surface chamfer 12 is formed.

A quantity of hardfacing material may then be deposited and melted on the flat surface 12 of the edge thereby machined.

Alternatively, depending on the use and the shape of the mould, the whole surface of said mould could be hardfaced. For example, a mould adapted to make a neck ring for a bottle is more fragile than a mould for the body bottle. Indeed, the parison remains longer in the neck ring mould than in the bottle mould. Therefore, such a mould requires a higher protection than a mould for a bottle. In that purpose, the whole surface of the mould can be machined in order to obtain a flat surface, the whole machined surface being then hardfaced in accordance with the invention.

The method according to the invention is carried out preferably cold on the mould 1, notably in the case where the mould is made of lamellar cast iron. In fact, as will be seen later in the description, during the method the mould is locally heated at the level around the edge to be hardfaced: preheating the mould would thus have a tendency to locally raise too much the temperature of the mould compared to the time necessary for its cooling, thereby leading to an important risk of local rupture of the mould.

It will be noted that the expression "cold" in this meaning is not limited to moulds used at ambient temperature, but it extends to moulds that could have undergone treatments increasing their temperature, which must be distinguished from the specific preheating according to the prior art (at temperatures of the order of 350° C.-450° C.) prior to hardfacing.

The hardfacing material 11 is constituted of at least one metal or metal alloy. It may for example be constituted of alloy based on nickel, nickel carbide, and/or instead comprise cobalt. Moreover, it may advantageously come in powder form, which makes it possible to melt it more quickly.

The melting of the hardfacing material 11 is carried out by means of a power laser 2, which can be, by way of non-limiting example, an argon laser. The laser emits a beam 21 which has a focusing zone 211, as illustrated in FIG. 2. Said focusing zone is situated at a given distance from the output point of the beam 21, depending on the type of laser, and which can be adjusted notably by playing on the relative position of the mirrors that constitute it. Typically, the focusing zone may be situated at a distance of the order of 15 mm from the laser output. The focusing zone 211 also has dimensions that depend on the type of laser used. Typically, for a beam of the laser of 3.5 mm, said zone may extend over a length of 3 to 4 mm.

The beam 21 of the laser 2 impacts the flat surface chamfer 12 of the mould 1 to make it melt superficially, and perform the welding between the part and the hardfacing material, such that the mould is heated very locally. The temperature of the beam 21 of the laser 2 attains a value of the order of 1100° C. to 1200° C., enabling at the same time the dilution of the hardfacing material and a melting on the surface of the cast iron, the bronze or the steel constituting the mould to be hardfaced.

According to an embodiment of the invention, illustrated in FIG. 1a, the steps of depositing and melting the hardfacing material are carried out simultaneously. To do this, the laser is aimed at the mould 1 to be hardfaced, and the hardfacing material 11 is sprayed in powder form onto the mould 1 and in the beam of the laser by means of a nozzle 3. As illustrated in FIG. 1a, the nozzle 3 may be coaxial to the beam of the laser, and, if appropriate, integral therewith. Alternatively, it may be separate from the laser, and if appropriate not coaxial to the beam.

Figure 7:
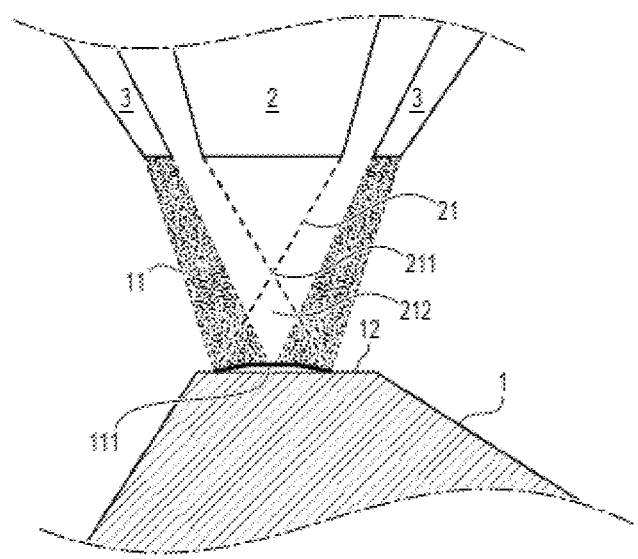
FIG. 7 is a section view of an example of positioning of the laser provided with a nozzle coaxial with respect to the surface of a glass mould that has to be hardfaced.

The mould to be hardfaced is then advantageously situated downstream of the focusing zone 211 of the beam of the laser, in other words at the level of the divergent portion of the beam of the laser 2, as illustrated in FIG. 7. For example, the laser 2 may be positioned such that the focusing point is located at a distance comprised between 2 mm and 15 mm from the surface of the mould, typically ten or so millimeters. The hardfacing material 11 for its part may typically be sprayed onto the surface of the mould 1, in the beam 21 of the laser 2, downstream of the focusing zone 211 thereof. To do this, in particular in the case of a laser provided with a coaxial nozzle for spraying the hardfacing material, the positioning of the focusing zone 211 may for example be adjusted by means of mirrors so as to bring it closer to the output of the laser 2. In fact, the spraying angle of the nozzle 3 cannot in general be modified.

In this way, the temperature being lower at the level of the divergence 212 of the laser 2 than at the level of the focusing zone 211, the local temperature of the surface of the mould is lower than if the mould was placed in the focusing zone 211. Furthermore, the laser beam having a larger section at the level of the divergence 212 than in the focusing zone, it is possible to melt more hardfacing material 11, such that a wider bead is obtained than when the surface of the mould is placed in the focusing zone.

According to an alternative embodiment of the method, illustrated in FIG. 1b, the steps of depositing and melting the hardfacing material are carried out successively. The hardfacing material is then deposited on the mould to be hardfaced by a spray nozzle 3 or any other known means separate from the laser before being melted by exposure to the beam 21 of the laser 2.

Depending on the diameter of the nozzle and the distance between the focusing zone 211 of the laser, the deposited material surface may have for example a dimension of the order of $5/10^{th}$ mm to 15 mm, and preferably of the order of 1 to 7 mm. An example of deposition of material is illustrated in FIG. 3.

In order to achieve the complete hardfacing of the surface of the mould, the laser is displaced relatively thereto according to a scanning movement so as to form one or more parallel beads of material and cover the whole of the surface to be hardfaced. In the case where the powder of hardfacing material 11 is sprayed via a coaxial nozzle 3, the nozzle 3 is preferably integral with the laser 2 in order to be able to make the same displacements.

The displacement of the laser takes place advantageously at constant speed, in order that the quantity of hardfacing material is uniform over the entire surface of the mould to be hardfaced.

At constant flow rate of deposition of material, the dimensions of the deposited bead vary as a function of the speed of the laser and the distance between the flat surface chamfer 12 formed on the edge of the mould 1 and the focusing zone 211 of the laser. It will obviously be understood that the dimensions of the bead may also be modified by adjusting the flow rate of the sprayed material.

For example, for a hardfacing with an argon laser having a power of the order of 3000 W and a focal diameter of 3 mm, a hardfacing material 11 in powder form, sprayed at a flow rate of the order of 20 g/min, a displacement speed of the laser 2 of the order of 800 mm/min and a distance between the flat surface chamfer 12 and the focusing zone 211 of the order of 10 mm, a bead of hardfacing material of around 1.5 mm of thickness for 5 to 7 mm width may be obtained.

Advantageously, by moving the mould 1 away from the focusing zone 211 of the laser 2 and by reducing the displacement speed of the laser 2, it is then possible to hardface moulds 1 in only carrying out a single passage, or two according to the dimensions of the flat surface chamfer 12 to be hardfaced.

In fact, as we have seen above, the dimensions of the bead are more important when it is placed downstream of the focusing zone, at the level of the divergence 212 of the laser beam, than when the mould 1 is arranged at the level of the focusing zone 211.

Furthermore, it becomes moreover possible to hardface moulds made of lamellar cast iron, without risking that the mould cracks or is damaged. In fact, the local raising of the temperature of the mould by the laser 2 is lower at the level of the divergence 212 than in the focusing zone 21, such that it is possible to reduce the passage speed of the laser without increasing too much the local temperature of the flat surface chamfer 12. Consequently, the temperature gradient due to the passage of the laser is not too important in comparison with the temperature gradient of the surface during the cooling thereof, and the mould thus does not risk cracking, even when it is made of lamellar cast iron.

The method according to the invention thus makes it possible to treat moulds not just made of lamellar cast iron but also spheroidal cast iron, as well as alloys of other types.

Depending on the desired results in terms of geometry of the mould, but also if it is wished to consolidate it, several layers of material may be stacked by successive passages of the laser at the same spot.

Moreover, the laser is displaced in a plane parallel to the surface of the mould, according to a determined path depending on the surface to be hardfaced. For example, for the case of a flat surface chamfer 12 having a main direction P, the laser can carry out several passages in translation along said main direction P, with an offset between each passage, such that part of the material deposited at one passage covers the material deposited during the preceding passage, as may be seen in FIGS. 3 and 5. The offset may then be of the order of 2 mm, for a thickness of deposited material of the order of 1 to 1.5 mm. As an example, a bead having a thickness of the order of 1.5 mm may be obtained in one passage, and 2.5 mm in two passages.

The method according to the invention may comprise an additional step of cooling the hardfaced mould. It may be a cooling by stages. Advantageously, if the hardfacing has been carried out cold, this step only requires little time (of the order of several minutes as a function of the mass of the part and the importance of the hardfacing).

On cooling, the hardfacing material 11 then constitutes a reinforcement and protective layer 111 of the edge of the mould 1 more resistant to the moulding cycles than the rest of the mould 1.

Finally, a final step of the method consists in machining the reinforcement and protective layer 111, to remove the surplus of material and adjust the form of the hardfaced part of the mould as a function of the desired geometry, and/or to obtain a desired surface condition.

Examples

With reference to FIGS. 4 and 5, an example of application of the method according to the invention is represented.

Figure 4B:
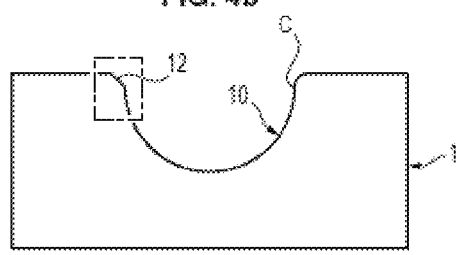

The figures represent a flat surface chamfer 12 formed on the edge of a concave part of a mould (represented in FIG. 4a), instead and in place of an edge that normally delimits this concave part, for example a neck C, as represented in FIG. 4b.

Figure 4C:
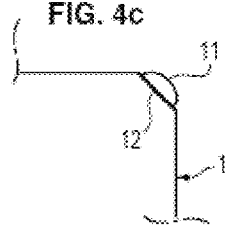
Figure 4D:
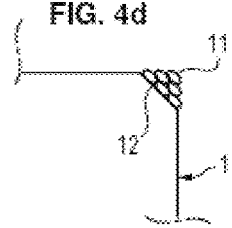
Figure 5A:
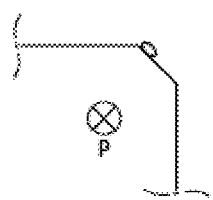
FIGS. 5a to 5f represent an example of succession of steps for the hardfacing of the mould at the level of the chamfer.
Figure 5B:
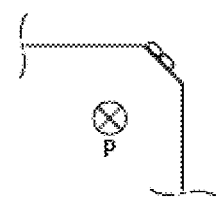
Figure 5C:
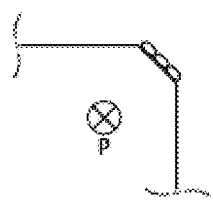
Figure 5D:
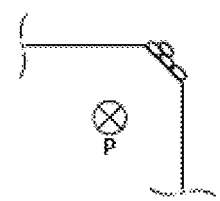
Figure 5E:
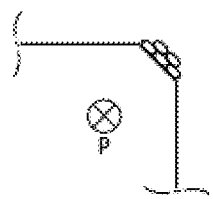
Figure 5F:
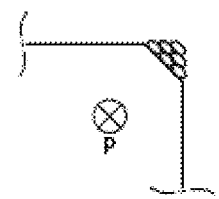
Figure 6:
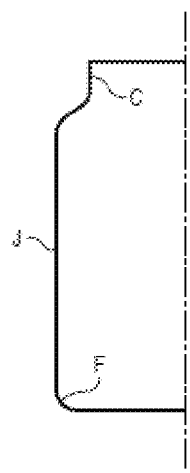
FIG. 6 illustrates a section view of the glass mould of FIG. 4a along the axis Y-Y.

With reference to FIG. 4c, an example of chamfer hardfaced according to a form of embodiment of the method according to the invention is schematically represented.

In this example, the flat surface chamfer 12 has a width of 3 mm, a height of 3 mm and a given longitudinal extension according to the main direction P.

In order to hardface such a flat surface chamfer 12, a single passage of the laser 2 is carried out along the main direction P, placing the flat surface chamfer 12 at a distance of around 10 mm from the focusing zone 211, displacing the laser 2 at a speed of the order of 800 mm/min, and feeding the hardfacing material 11 in metal powder form according to a flow rate of the order of 20 g/min. A bead of hardfacing material 11 is then formed on the flat surface chamfer 12, the bead having dimensions of the order of 3 mm of thickness for 3 mm wide.

In a variant, as illustrated in FIGS. 5a to 5f, it is also possible to carry out several passages of the laser 2 along the main direction P, according to a determined order, here six successive passages, by adjusting the flow of powder to a value comprised between 10 g/min and 40 g/min for example, the distance between the flat surface chamfer 12 and the focusing zone 211 and/or the passage speed of the laser 2.

Then, the bead of hardfacing material 11 is machined to obtain a sharp edge at the side of the concavity, conforming to the initial geometry of the mould 1.

The method of the invention has numerous advantages compared to the techniques of the prior art.

Firstly, the time necessary for the hardfacing of a mould is reduced, since the high temperature of the laser enables the welding to be carried out more quickly. Typically, the laser can carry out the hardfacing at a speed ranging from 800 mm/min to 2000 mm/min when the deposition of hardfacing material is carried out with a flow rate of the order of 40 g/min, as in our preceding example. On account of this speed, the dimension of the HAZ is also reduced compared to the hardfacing techniques known from the prior art.

Moreover, the rapidity of the welding, the slow speed of the laser 2 and the distance between the mould 1 and the focusing zone 211 enable the method to be applicable to spheroidal cast irons as to lamellar cast irons, or to be applied in the same way to any type of cast iron independently of the percentage of carbon thereof.

Finally, the high energy density of the laser (very high temperature applied on a very localised surface) enables a hardfacing of great precision, which implies a saving in the quantity of hardfacing material deposited on the mould.

These advantages have been able to be quantified by means of comparative tests between PTA hardfacing, which is the method of hardfacing glass moulds of the prior art having the best results, and the hardfacing by laser according to the invention.

The results presented relate to tests carried out on cast iron bars (the cast iron being identical to a cast iron used for moulds), of dimensions 40*40*200 mm. On these parts have been machined two chamfers.

During the tests were measured the dimensions of the HAZ, the time necessary for the hardfacing of the part and the thickness of material deposited to fill 4 mm of chamfer. The results are presented in the following table.

|  | PTA hardfacing | Laser hardfacing |
|---|---|---|
| HAZ dimension | 2 mm | 0.2 mm |
| Hardfacing time | 3 min | 40 s |
| Hardfacing deposition thickness | 10 mm | 7 mm |

As may be seen, according to these three criteria, the method of hardfacing by laser is more efficient than the PTA method. It gives results of a better metallurgical quality, makes it possible to make a substantial saving in time and money because it is more rapid and consumes less hardfacing material than traditional methods.

Consequently, the invention makes it possible to hardface a glass mould, whether it is made of cast iron, bronze (and other alloys comprising copper and tin) or steel, at the thermal and mechanical stresses that it is intended to undergo, in a simple, rapid and economic manner, only applying a hardfacing material locally, in the zones at risk of the mould (namely at the level of the edges thereof, in other words at the level of the neck C, the joint plane J and the bottom F of the mould 1), and to do this adapts the technique of laser hardfacing, during which a metal powder is made to melt on the edge machined beforehand by means of a power laser.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of hardfacing a glass mould made of cast iron, bronze, or steel, comprising:
   forming a flat surface chamfer by machining an edge of at least one of a neck, bottom, or joint plane of the glass mould; and
   forming a reinforcement zone comprising:
   (a) depositing a hardfacing material on the flat surface chamfer thereby machined, wherein the hardfacing material comprises a metal or a metal alloy; and
   (b) melting and welding the hardfacing material on the flat surface chamfer;
   wherein step (a) and step (b) occur simultaneously to produce a local raising of the temperature at the flat surface chamfer by means of a beam of a laser,
   wherein the flat surface chamfer of the glass mould to be hardfaced is arranged downstream at a distance between 2 mm and 15 mm from a focusing zone of the beam of the laser, and
   wherein a heat affected zone from the local raising of the temperature by the laser is at the flat surface chamfer.

2. The method of claim 1, wherein the depositing and the welding the hardfacing material are implemented without preheating the glass mould.

3. The method of claim 1, wherein the hardfacing material comes in powder form.

4. The method of claim 3, wherein the hardfacing material is sprayed by means of a nozzle on the glass mould.

5. The method of claim 1, wherein the hardfacing material is sprayed on the flat surface, downstream of the focusing zone of the beam of the laser.

6. The method of claim 1, wherein one or two passages of the beam of the laser are carried out on the flat surface chamfer of the glass mould to be hardfaced according to a controlled scanning speed.

7. The method of claim 6, wherein the scanning speed is between 600 mm/min and 2000 mm/min.

8. The method of claim 1, comprising a step of machining the reinforcement zone created by the welding of the hardfacing material.

9. The method according to claim 1, wherein the focusing zone is arranged at a distance of about ten millimeters from the flat surface chamfer.

* * * * *